US012644310B2

(12) United States Patent
Krieger et al.

(10) Patent No.: US 12,644,310 B2
(45) Date of Patent: Jun. 2, 2026

(54) TWO DIRECTION MAGNETICALLY LATCHING SOLENOID FOR APPLIANCE DOOR LOCK

(71) Applicant: ILLINOIS TOOL WORKS INC., Glenview, IL (US)

(72) Inventors: Jeffrey John Krieger, Mukwonago, WI (US); Randy S. McDonald, Sussex, WI (US); Erik Olson, Waterford, WI (US); Joel Charles Bragg, Waterford, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 38 days.

(21) Appl. No.: 18/644,947

(22) Filed: Apr. 24, 2024

(65) Prior Publication Data

US 2024/0368920 A1 Nov. 7, 2024

Related U.S. Application Data

(60) Provisional application No. 63/464,362, filed on May 5, 2023.

(51) Int. Cl.
*E05B 47/00* (2006.01)

(52) U.S. Cl.
CPC ................................ *E05B 47/0004* (2013.01)

(58) Field of Classification Search
CPC ................................................... E05B 47/0004
See application file for complete search history.

(56) References Cited

U.S. PATENT DOCUMENTS

| | | | | |
|---|---|---|---|---|
| 3,367,697 | A * | 2/1968 | Fox, Sr. | F24C 15/022 292/113 |
| 4,109,637 | A * | 8/1978 | Drouin | F24C 15/022 126/197 |
| 4,314,217 | A * | 2/1982 | Krasser | D06F 37/42 335/190 |
| 4,784,415 | A | 11/1988 | Malaval | |
| 6,079,756 | A * | 6/2000 | Phillips | E05B 47/0002 292/229 |
| 6,639,496 | B1 * | 10/2003 | van Namen | H01F 7/1615 335/229 |

(Continued)

FOREIGN PATENT DOCUMENTS

| | | |
|---|---|---|
| DE | 196 25 657 A1 | 1/1998 |
| EP | 3 591 673 A1 | 1/2020 |
| GB | 1027630 | 4/1966 |

OTHER PUBLICATIONS

EPO, Munich, Germany, EPO Form 1503 03 82, extended European Search Report for European Application EP 24 173 971, Nov. 14, 2024 (8 pages).

*Primary Examiner* — Mark A Williams
(74) *Attorney, Agent, or Firm* — Pauley Erickson & Swanson

(57) ABSTRACT

An appliance latch for latching an appliance door to an appliance cabinet that includes a housing and a lock bolt positioned to move linearly within the housing between a locked state and an unlocked state. A solenoid is positioned within the housing and includes an integrated magnetic lock, distinct from the lock bolt, to prevent undesired movement from the locked state to the unlocked state and movement from the unlocked state to the locked state.

13 Claims, 7 Drawing Sheets

(56) References Cited

U.S. PATENT DOCUMENTS

| | | | |
|---|---|---|---|
| 10,167,832 B2 | 1/2019 | Deland | |
| 2007/0144880 A1 | 6/2007 | Bragg et al. | |
| 2015/0115622 A1* | 4/2015 | Burdenko | E05B 47/026 307/43 |
| 2015/0354248 A1* | 12/2015 | Promutico | D06F 37/42 292/138 |
| 2015/0361690 A1* | 12/2015 | Hintz | A47L 15/4259 292/138 |
| 2016/0125992 A1 | 5/2016 | Irwin | |

* cited by examiner

TWO DIRECTION MAGNETICALLY LATCHING SOLENOID FOR APPLIANCE DOOR LOCK

CROSS REFERENCE TO RELATED APPLICATION

This application claims the benefit of U.S. Provisional Application, Ser. No. 63/464,362, filed on 5 May 2023. The co-pending provisional application is hereby incorporated by reference herein in its entirety and is made a part hereof, including but not limited to those portions which specifically appear hereinafter.

BACKGROUND OF THE INVENTION

Field of the Invention

This invention relates generally to a latch for an appliance door lock.

Description of Prior Art

In the appliance industry, a common method for locking and unlocking washing machine door or lid is to use a solenoid. Typically, the solenoid is pulsed to lock the door, and then pulsed again to unlock it. Solenoids of this kind are generally a copper coil with a steel core in the center of it. Energizing the coil moves the steel core or "plunger" into the center of the coil. Typically, the locked or unlocked state is maintained with a spring, wire form, and a heart-shaped track. Occasionally, a rocker arm or a rotary ball-point pen style mechanism are used.

One problem with solenoids in this particular application is that they may be energized mechanically instead of electrically. This may occur by a g-force that comes from shock or vibration. For example, washing machines can see g-forces when they are shipped to the consumer. This is troublesome because, if the machine arrives locked, the consumer may not be able to complete the installation. Alternatively, if the machine is locked and running, it is possible that a severe out-of-balance load could mechanically move the solenoid from the locked to unlocked condition, which could cause a safety concern.

One existing appliance lock with a magnetic latch is taught in U.S. Pat. No. 7,900,979, which is incorporated herein by reference. This design prevents the washing machine from becoming locked in transit. However, it does not prevent accidental unlocking due to severely out-of-balance clothing. Another existing appliance latch is shown in U.S. Pat. No. 11,352,731, which is also incorporated herein by reference.

Other lid locks may include a mechanical interlock that prevents locking if the door is open. This prevents the appliance from accidentally locking due to a control failure, for instance, if the control mistakenly sends an electrical locking signal when the door is open. However, this does not prevent accidental locking when the appliances are shipped, because they are shipped with the doors closed to prevent damage.

A need therefore exists for an appliance lock that will not fail due to shocks or vibrations that unintentionally trigger a movement of the solenoid from the locked to the unlocked condition or vice-versa.

SUMMARY OF THE INVENTION

The subject invention preferably includes a solenoid that latches to prevent accidental movement in both directions unlocked-to-locked, and locked-to-unlocked. One embodiment of the subject invention preferably includes a lid lock with an added magnetic latch, for instance a wire form. In one embodiment, two step features are preferably formed into the housing. If the solenoid plunger and lock bolt move mechanically, the magnetic latch will interfere with one of the steps on the housing, preventing it from travelling far enough to change state. If the solenoid of the lid lock is energized electrically, the magnetic flux from the coil will rotate the wire form towards the center of the coil. This will disengage it from the step in the housing and will allow the lock bolt to completely travel to the next state.

Alternative embodiments may include a second solenoid, an inertia latch, a stamping instead of a wire form, an O-ring compressed by a stamping, and/or other embodiments that include a solenoid to prevent movement in both directions.

Preventing appliances from accidentally locking in transit eliminates field service calls for the appliance manufacturer. Preventing washing machines from accidentally unlocking due to an out-of-balance load improves the product safety for the consumer.

Other objects and advantages will be apparent to those skilled in the art from the following detailed description taken in conjunction with the appended claims and drawings.

DETAILED DESCRIPTION OF THE INVENTION

Figure 1:
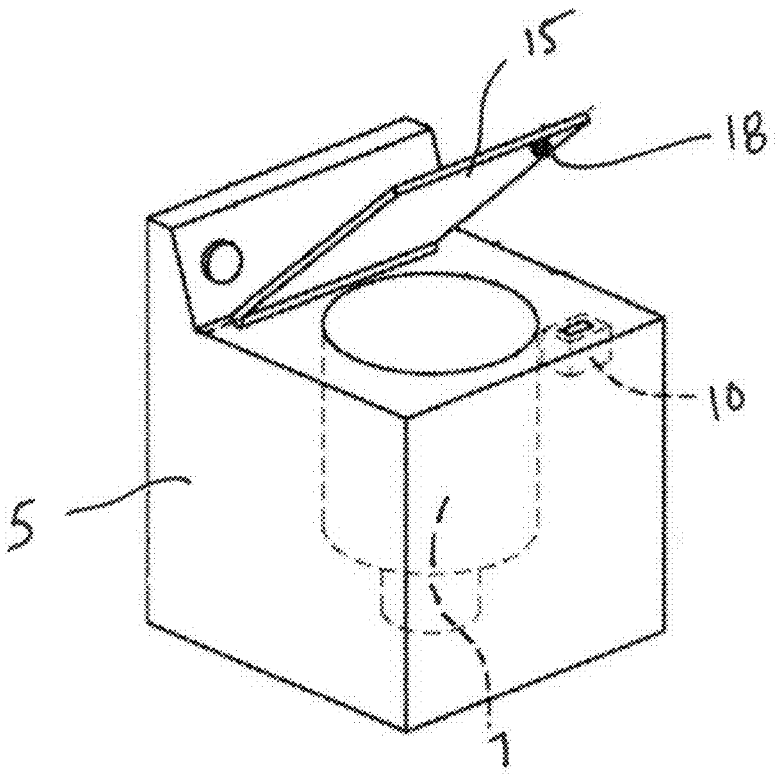
FIG. 1 shows a schematic of an appliance, namely a top load washing machine, for use with the subject latch.
Figure 2:
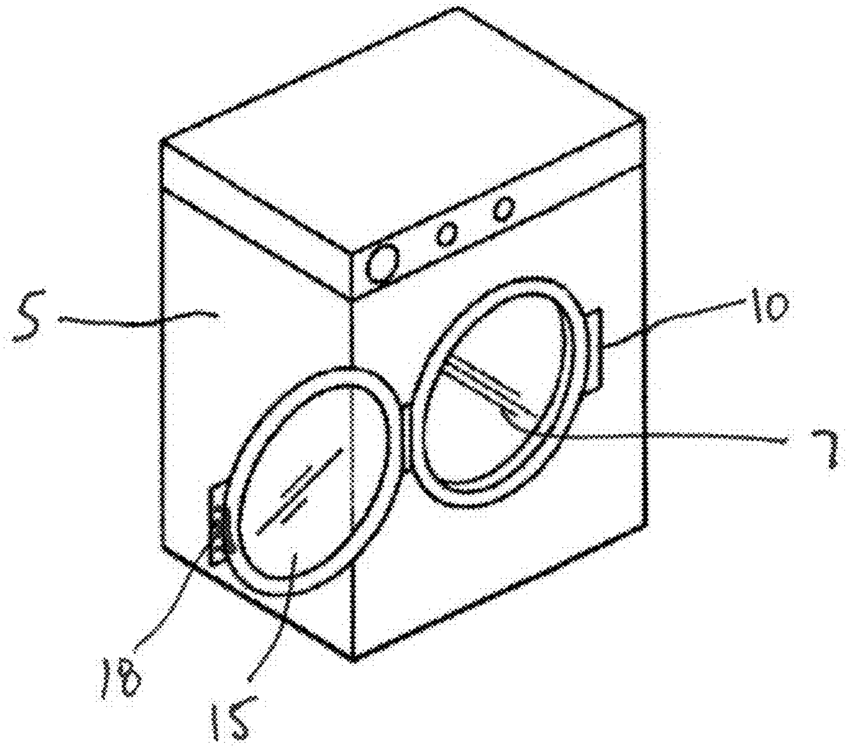
FIG. 2 shows a schematic of an appliance, namely a front load washing machine, for use with the subject latch.

FIGS. 1 and 2 show schematics of appliances for use with the subject latch. FIG. 1 shows a top load washing machine and FIG. 2 shows a front load washing machine, however the subject invention is adaptable to other appliances including dryers, dishwashers, refrigerators, or any number of other household and commercial appliances that require safe operation throughout all operating conditions.

As shown in FIGS. 1 and 2, an appliance includes a cabinet 5 and an associated door 15. The door 15 preferably pivots around an axis and is lockable or latchable in an area opposite the pivot axis. In this way, the door 15 is openable to expose a volume containing a spin basket 7 in the case of the washing machines shown in FIGS. 1 and 2.

Figure 3:
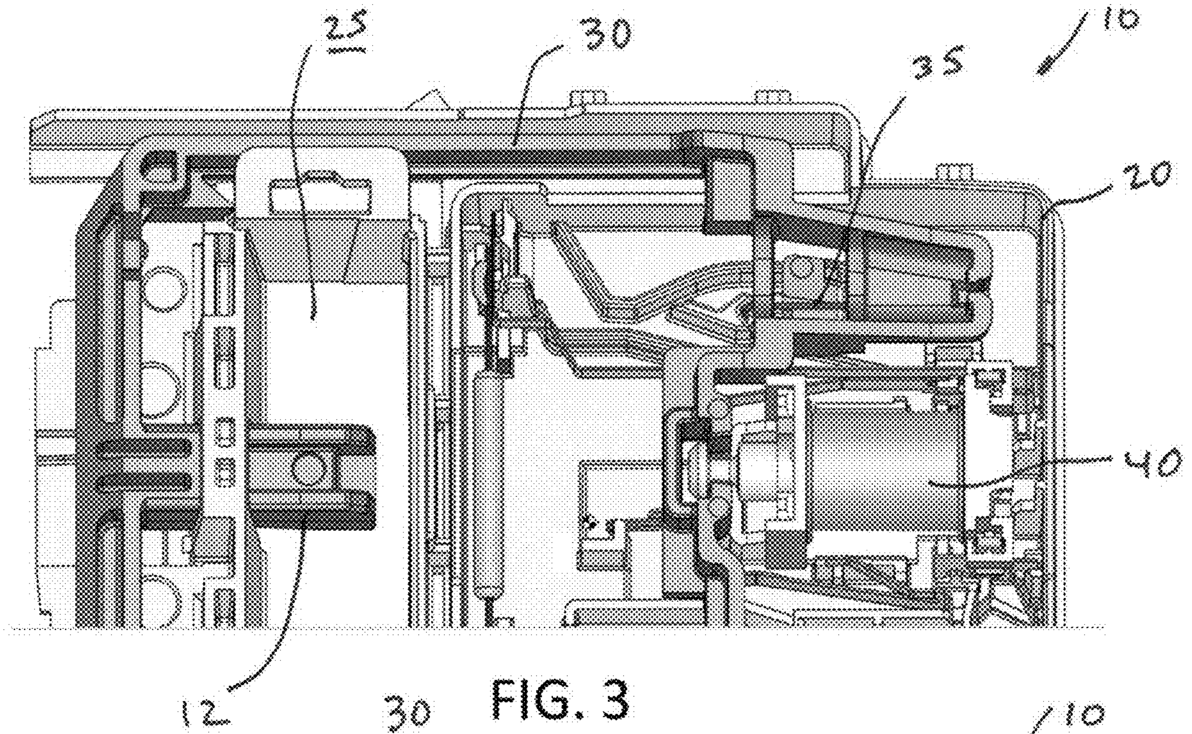
FIG. 3 shows a top cutaway view of a latch according to one embodiment in a locked state with a lock pin engaged with a lock strike (not shown)
Figure 4:
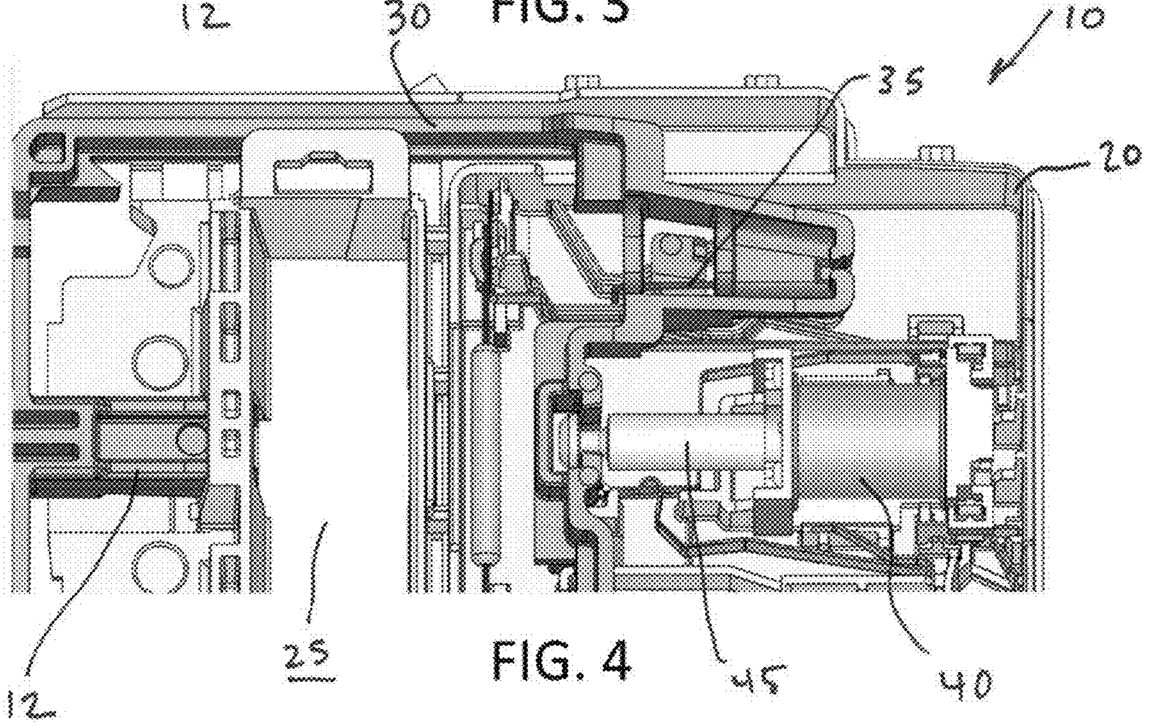
FIG. 4 shows a top cutaway view of a latch according to one embodiment in an unlocked state with a lock pin disengaged from a lock strike (not shown)

As shown in FIGS. 1 and 2, a lock strike 18 is preferably associated with the door 15 and is engageable with a latch 10 positioned within the cabinet 5 to create and maintain a connection between the door 15 and the cabinet 5. As best shown in FIGS. 3 and 4, once the door 15 is closed on the cabinet 5, the lock strike 18 (not shown) preferably enters an opening 25 in the latch 10 and is then engageable with a lock pin 12 to create a locked state. The latch 10 and specifically the lock pin 12 is preferably moveable in and out of the lock strike 18 between a locked state and an unlocked state.

As further shown in FIGS. 3 and 4, the latch 10 preferably includes a housing 20. The housing 20 preferably comprises one or more integrated molded components for accommodating the mechanical and electro-mechanical function described herein.

A lock bolt 30 is preferably positioned within the housing 10 to move linearly within the housing between a locked state and an unlocked state. The lock bolt 30 is preferably frame-like and includes the lock pin 12 and operates as the primary lockable connection between the door 15 and the cabinet 5. As such, a portion of the lock bolt 30 is additionally connected within the housing 20 to a solenoid 40 and a wire stylus 35. The wire stylus 35 preferably traces within a heart-shaped track formed in the housing 20 between the locked state and the unlocked state as shown respectively in FIGS. 3 and 4.

As best shown in FIGS. 3 and 4, a solenoid 40 is additionally positioned within the housing 20. The solenoid 40 is preferably a standard pull-in type solenoid operable using preferably alternating current at line voltages. The solenoid 40 preferably includes a central slideable plunger 45 connected to the lock bolt 30 preferably around a collar of the plunger 45 engageable with a molded groove of the lock bolt 30.

In addition, as best shown in FIGS. 5-11, an integrated magnetic lock 50, distinct from the lock bolt 30, is configured to prevent undesired movement from the locked state to the unlocked state and movement from the unlocked state to the locked state. Such additional magnetic lock 50 is particularly important for situations where the solenoid 40 may be inadvertently energized mechanically instead of electrically-either in the locked state or the unlocked state. As described, this may occur by a g-force that comes from shock or vibration during shipment or during operation particular when an unbalanced load is present in the appliance.

Figure 6:
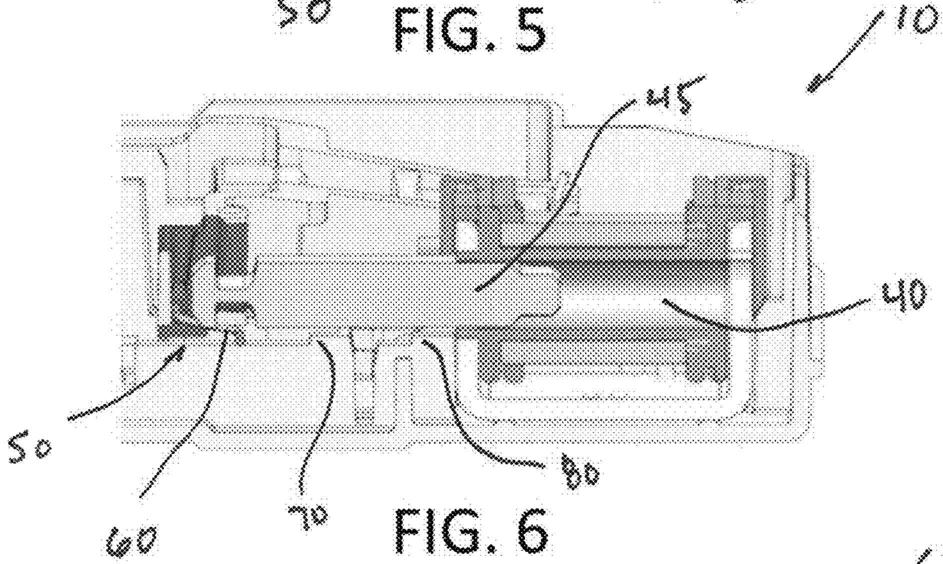
FIG. 6 shows a cutaway side view of the latch of FIG. 5 in an unlocked state with the solenoid powered off.
Figure 7:
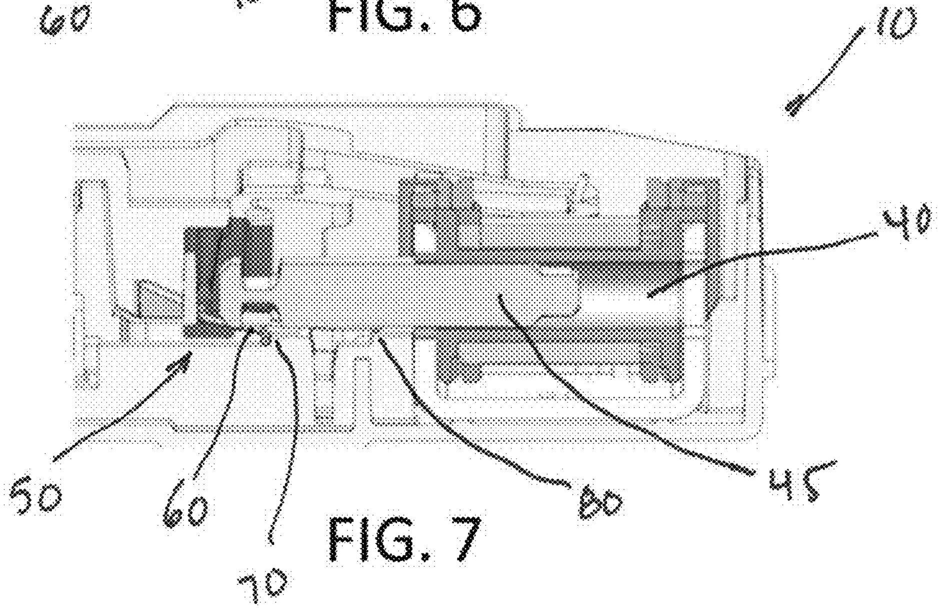
FIG. 7 shows a cutaway side view of the latch of FIG. 5 in the unlocked state with the solenoid powered off wherein additional movement of a lock bolt is blocked by a magnetic lock.
Figure 9:
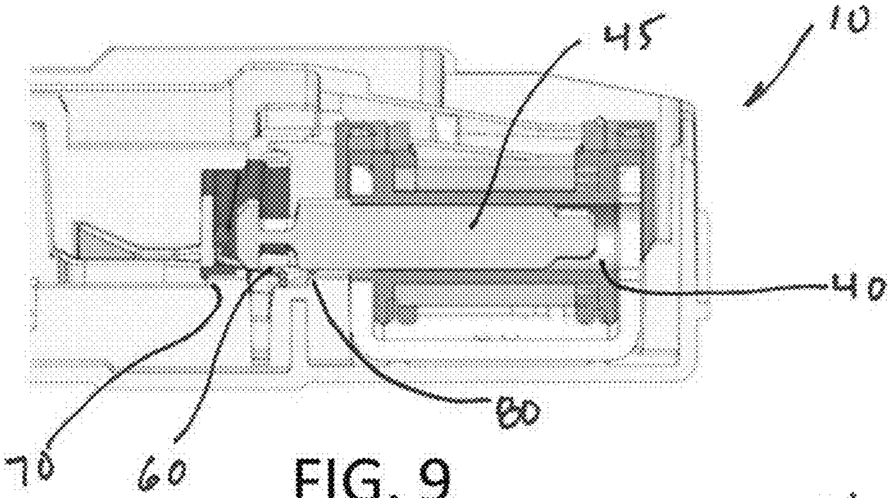
FIG. 9 shows a cutaway side view of the latch of FIG. 5 in a locked state with the solenoid powered off.
Figure 10:
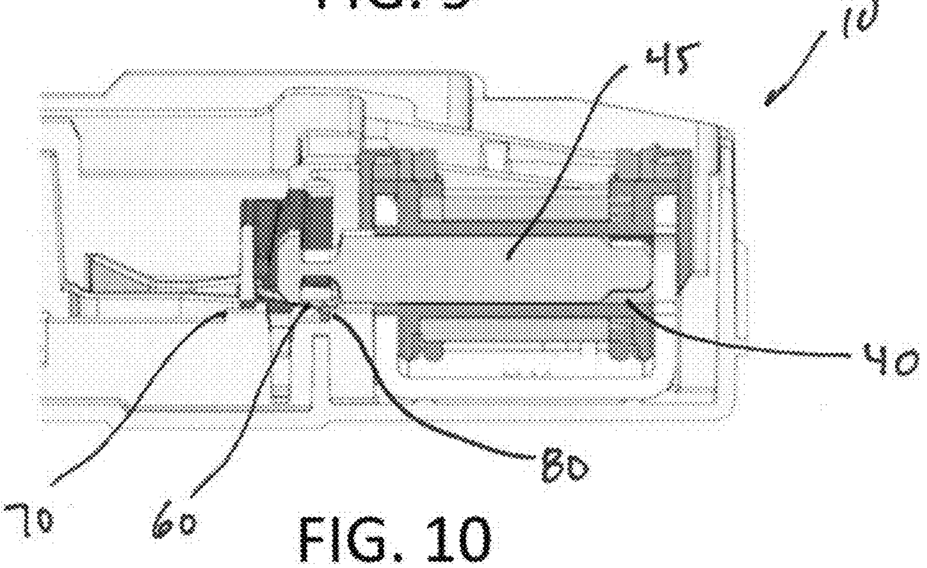
FIG. 10 shows a cutaway side view of the latch of FIG. 5 in the locked state with the solenoid powered off wherein movement of the lock bolt is blocked by the magnetic lock.

According to one preferred embodiment of the appliance latch 10, the integrated magnetic lock 50 comprises a wire form 60 engageable with a portion of the housing 20. Specifically, as shown in FIGS. 5-11, the wire form 60 is preferably engageable with a pair of step features 70, 80 formed within the housing 20. As best shown in FIG. 7, the wire form 60 is engageable with a first step feature 70 to prevent undesired movement from the unlocked state to the locked state and, as best shown in FIG. 10, a second step feature 80 to prevent undesired movement from the locked state to the unlocked state. The step features 70, 80 as described may be ridges or curbs formed or molded into the structure of the housing 20.

According to a preferred embodiment, the integrated magnetic lock 50 may comprise the wire form 60 configured to rotate inwardly when energized. In this way, when the solenoid 40 is properly energized, the wire form 60 rotates out of engagement with one of the step features 70 or 80, and thereby permits the lock bolt 30 movement between the locked state and the unlocked state. This avoids a mechanical energization of the solenoid 40 creating an inadvertent locked or unlocked state.

Figure 5:
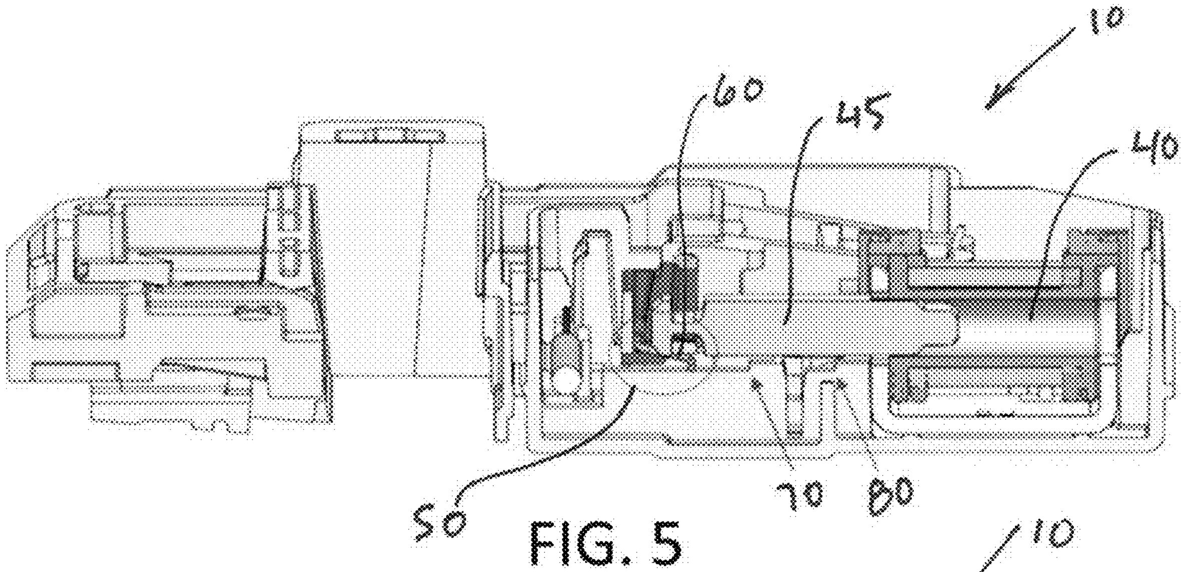
FIG. 5 shows a cutaway side view of a latch according to one embodiment.

FIG. 5 shows a cutaway side view of the latch 10 according to one embodiment. FIGS. 6-11 show the latch shown in FIG. 5 in various stages of operation from locked to unlocked and vice-versa. FIG. 6 shows the latch 10 in an unlocked state with the solenoid 40 powered off. As shown, the lock bolt 30 is not engaged and the plunger 45 of the solenoid 40 is fully extended. FIG. 7 shows the latch 10 in the unlocked state with the solenoid 40 powered off wherein additional movement of the lock bolt 30 is blocked by the magnetic lock 50. Specifically, the wire form 60 is obstructed from additional linear movement by the first step 70.

Figure 8:
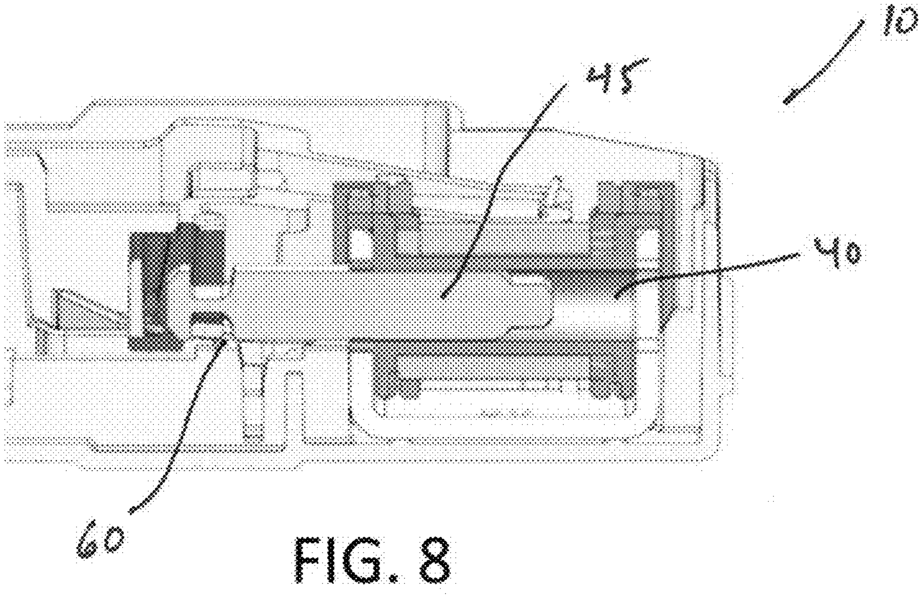
FIG. 8 shows a cutaway side view of the latch of FIG. 5 in an unlocked to locked transition with the solenoid powered on wherein movement of the lock bolt is not blocked by the magnetic lock.

FIG. 8 shows the latch 10 in an unlocked to locked transition with the solenoid 40 powered on wherein movement of the lock bolt 30 is not blocked by the magnetic lock 50. FIG. 9 shows the latch 10 in a locked state with the solenoid 40 powered off.

Figure 11:
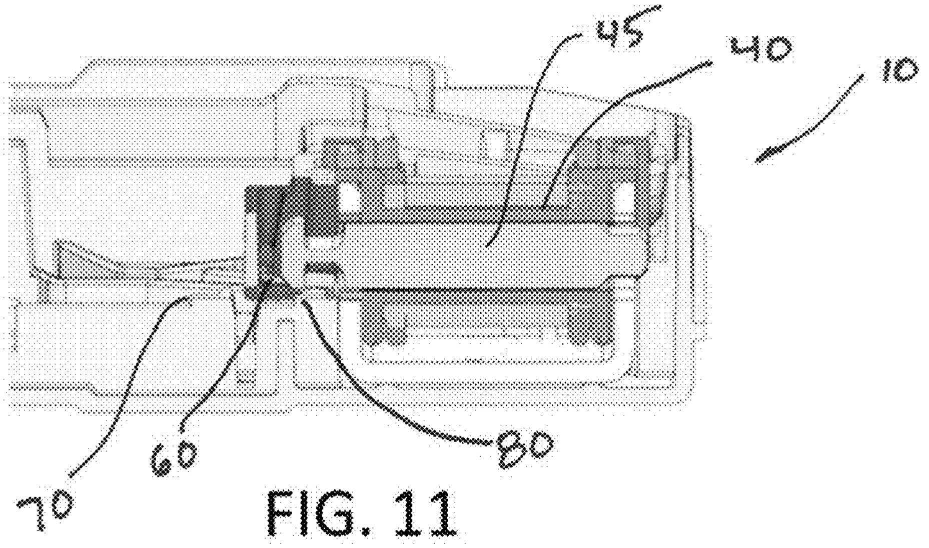
FIG. 11 shows a cutaway side view of the latch of FIG. 5 in a locked to unlocked transition with the solenoid powered on wherein movement of the lock bolt is not blocked by the magnetic lock.
Figure 12:
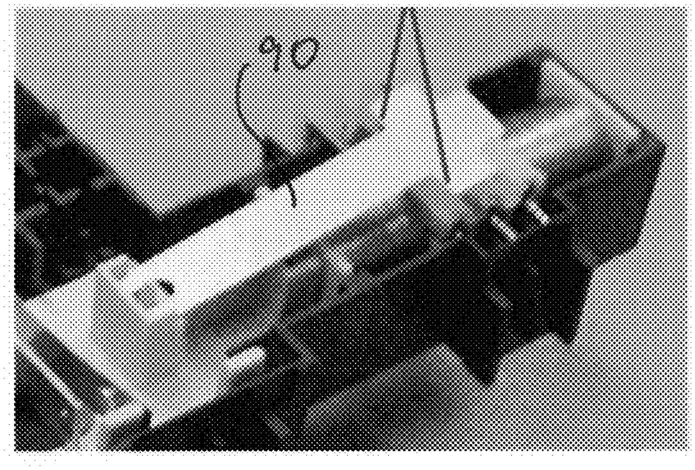
FIG. 12 shows one embodiment of a latch utilizing a stamping in the unlocked state.
Figure 13:
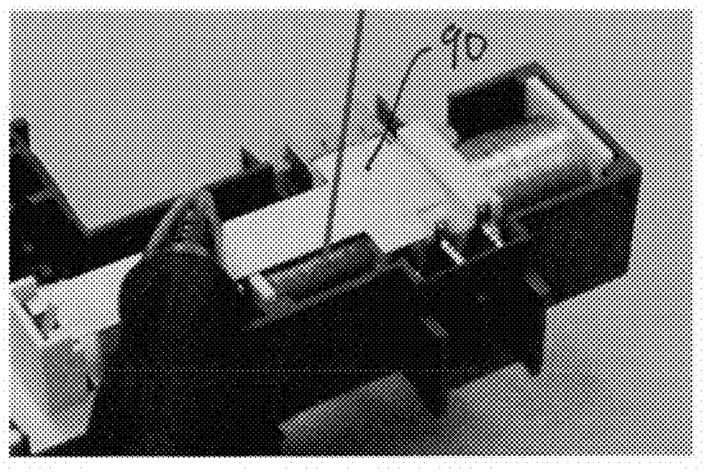
FIG. 13 shows the latch shown in FIG. 12 in the locked state.

FIG. 10 shows the latch 10 in the locked state with the solenoid 40 powered off wherein movement of the lock bolt 30 is blocked by the magnetic lock 50. FIG. 11 shows the latch 10 in a locked to unlocked transition with the solenoid 40 powered on wherein movement of the lock bolt 30 is not blocked by the magnetic lock 50.

FIG. 11 shows the latch 10 in the locked state with the solenoid powered on wherein movement of the lock bolt 50 is not blocked by the magnetic lock 50.

a. As alternatives to the wire form 60 embodiment described above, the integrated magnetic lock 50 may comprise a second solenoid, an inertia latch, a stamping instead of a wire form, an O-ring compressed by a stamping, and/or other alternatives. Accordingly, it is desirable that the integrated magnetic lock 50 comprises a component with a smaller mass than the plunger 45 so energizing the solenoid 40 moves the integrated magnetic lock 50 before the plunger 45. Alternatively, the integrated magnetic lock 50 may be driven by inertia instead of magnetics. It is one objective of the preferred appliance latch 10 to include a solenoid 40 that includes an additional magnetic lock 50 that latches to prevent accidental movement in both directions unlocked-to-locked, and locked-to-unlocked.

FIGS. 12 and 13 and 15 and 16 show two arrangements of how a stamping 90 could be used as the integrated magnetic lock 50. The mass of the stamping 90 is small compared to the mass of the plunger 45, so the stamping 90 will move first when the coil is electrically energized, which will release the plunger 45 and allow it to move. An arrangement including a stamping 90 is also shown in U.S. Pat. No. 7,900,979, which is incorporated herein by reference.

Figure 14:
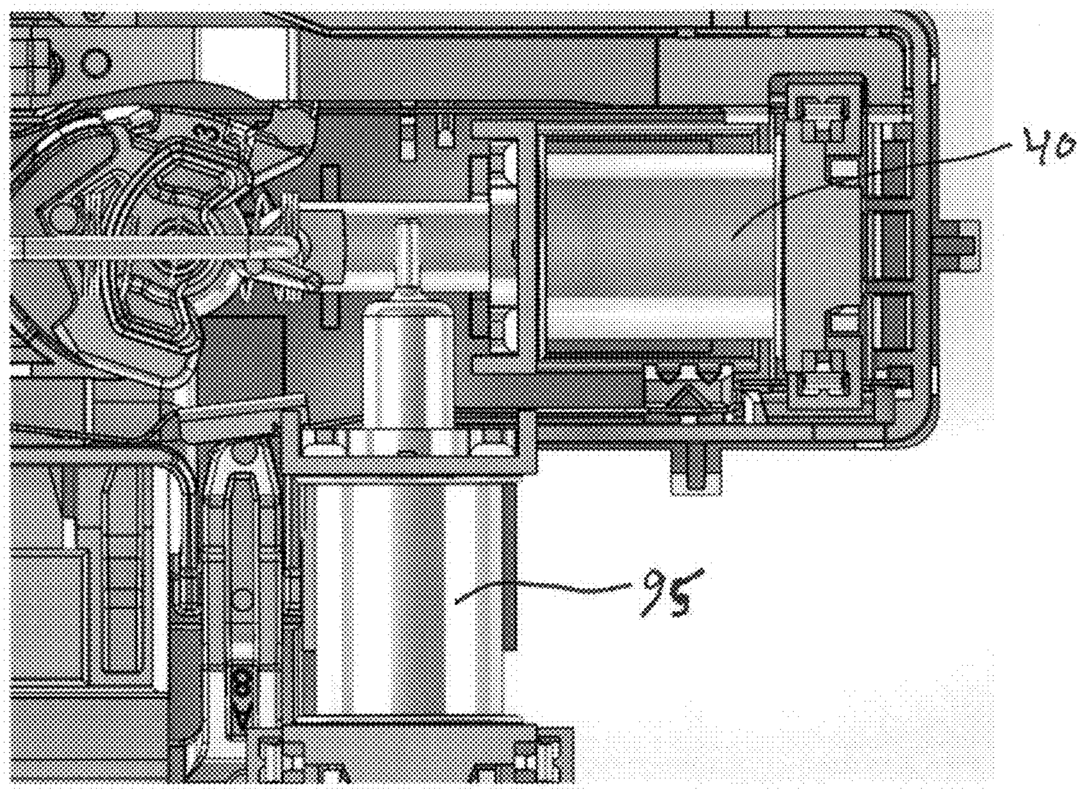
FIG. 14 shows one embodiment of a latch employing a two solenoid solution.
Figure 15:
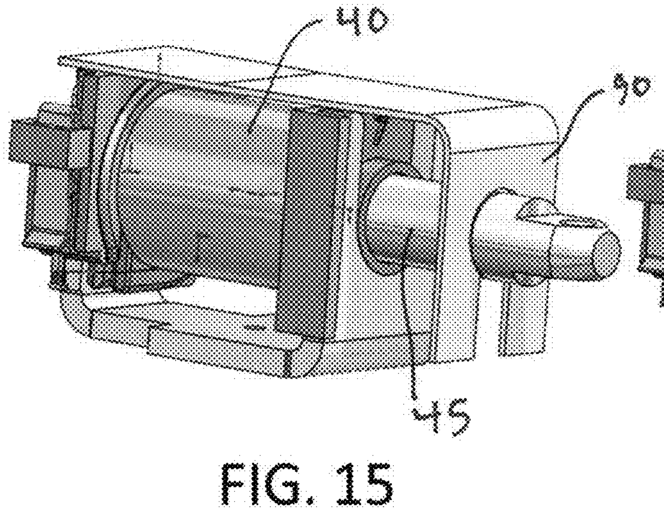
FIG. 15 shows one embodiment of a latch utilizing a stamping in the unlocked state.
Figure 16:
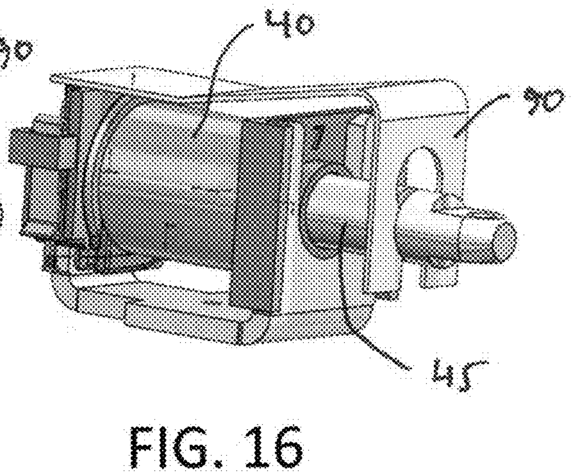
FIG. 16 shows the latch shown in FIG. 15 in the locked state.

FIG. 14 shows one embodiment of a two solenoid solution 40, 95. A second solenoid 95 preferably moves to lock the plunger 45 of the first solenoid 40.

Figure 17:
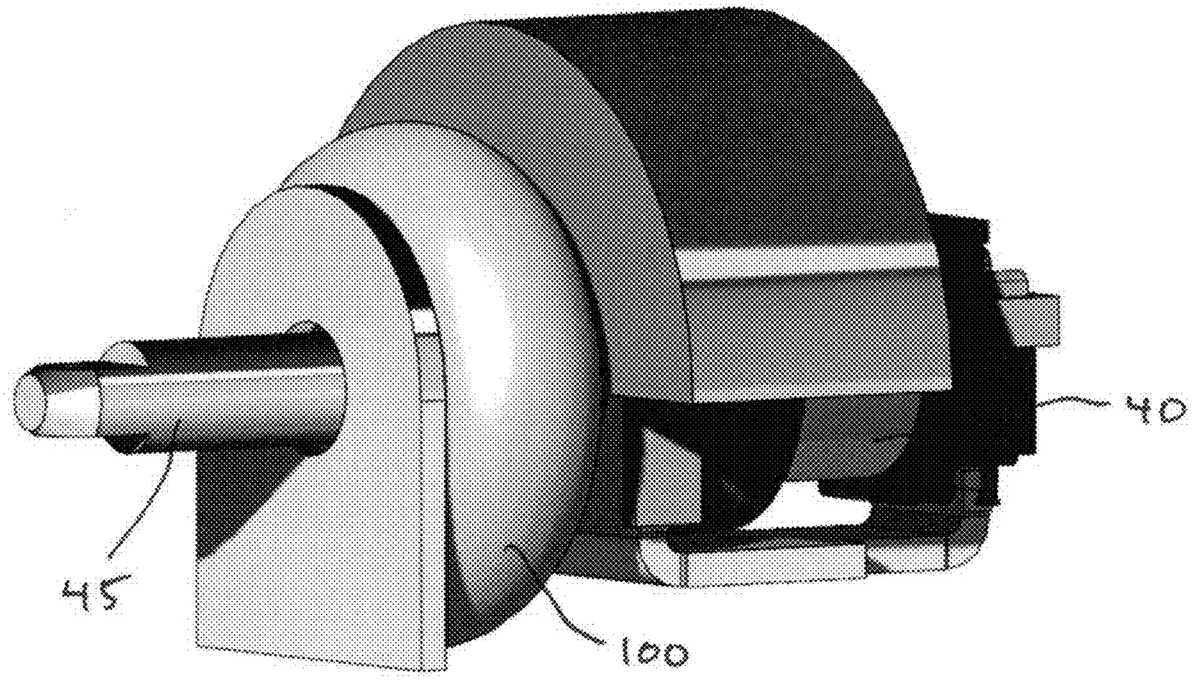
FIG. 17 shows one embodiment of a latch utilizing an O-ring.

FIG. 17 shows one embodiment wherein the integrated magnetic lock 50 comprises an O-ring 100. The arch-shaped feature shown in FIG. 17 is preferably nominally biased left to compress the O-ring 100. The inner diameter of the O-ring 100 is smaller due to the compression and therefore locks the plunger 45. When the solenoid 40 is electrically energized, the arch-shaped feature moves right to release the O-ring 100. The inner diameter of the O-ring 100 thus grows to free the plunger 45.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. An appliance latch for latching an appliance door to an appliance cabinet, the appliance latch comprising:

a housing;

a lock bolt positioned to move within the housing between a locked state and an unlocked state;

a solenoid positioned within the housing, the solenoid having an integrated magnetic lock comprising a wire form, separate from and operable with the lock bolt, to prevent undesired movement from the locked state to the unlocked state and movement from the unlocked state to the locked state, wherein the wire form is engageable with a pair of step features formed within the housing, wherein the wire form is engageable with a first step feature to prevent undesired movement from the unlocked state to the locked state and a second step feature to prevent undesired movement from the locked state to the unlocked state.

2. The appliance latch of claim 1 wherein the wire form is configured to move inwardly when the solenoid is energized.

3. The appliance latch of claim 1 wherein the lock bolt is connected with respect to the solenoid.

4. The appliance latch of claim 3 wherein the solenoid comprises a plunger that is engaged with the lock bolt.

5. The appliance latch of claim 4 wherein the integrated magnetic lock comprises a component with a smaller mass than the plunger so energizing the solenoid moves the integrated magnetic lock before the plunger.

6. The appliance latch of claim 1 further comprising a wire stylus that travels through a track of the housing between the locked state and the unlocked state.

7. The appliance latch of claim 1 wherein the integrated magnetic lock is driven by inertia.

8. The appliance latch of claim 1 wherein the integrated magnetic lock comprises one of a stamping, a ball bearing, and a pin.

9. The appliance latch of claim 1 wherein the integrated magnetic lock comprises a second solenoid.

10. The appliance latch of claim 9 wherein the solenoid and the second solenoid are connected electrically and are configured to energize simultaneously with a single electrical signal.

11. An appliance latch for latching an appliance door to an appliance cabinet, the appliance latch comprising:

a housing;

a lock bolt positioned to move within the housing between a locked state and an unlocked state;

a solenoid positioned within the housing, the solenoid having an integrated magnetic lock including a wire form engageable with a pair of step features formed within the housing, a first step feature configured to obstruct the wire form in the unlocked state and the second step feature configured to obstruct the wire form in the locked state;

wherein the integrated magnetic lock is configured to prevent undesired movement from the locked state to the unlocked state and movement from the unlocked state to the locked state and wherein the integrated magnetic lock comprises a component with a smaller mass than the plunger so energizing the solenoid moves the integrated magnetic lock before the plunger.

12. The appliance latch of claim 11 wherein the integrated magnetic lock comprises a wire form configured to move inwardly when the solenoid is energized.

13. The appliance latch of claim 11 wherein the integrated magnetic lock is driven by inertia.

* * * * *